United States Patent
Zafred et al.

(10) Patent No.: US 8,097,384 B2
(45) Date of Patent: Jan. 17, 2012

(54) SOLID OXIDE FUEL CELL WITH TRANSITIONED CROSS-SECTION FOR IMPROVED ANODE GAS MANAGEMENT AT THE OPEN END

(75) Inventors: Paolo R. Zafred, Murrysville, PA (US); Robert Draper, Pittsburgh, PA (US)

(73) Assignee: Siemens Energy, Inc., Orlando, FL (US)

( * ) Notice: Subject to any disclaimer, the term of this patent is extended or adjusted under 35 U.S.C. 154(b) by 819 days.

(21) Appl. No.: 12/169,261

(22) Filed: Jul. 8, 2008

(65) Prior Publication Data

US 2010/0009228 A1    Jan. 14, 2010

(51) Int. Cl.
*H01M 8/12* (2006.01)
*H01M 8/24* (2006.01)
*H01M 2/08* (2006.01)

(52) U.S. Cl. ............... 429/497; 429/466; 429/508

(58) Field of Classification Search .......... 429/456, 429/430, 423, 442, 465, 497, 466, 508, 492, 429/468; 204/260, 265
See application file for complete search history.

(56) References Cited

U.S. PATENT DOCUMENTS

| | | | |
|---|---|---|---|
| 4,476,198 A | 10/1984 | Ackerman et al. | |
| 4,490,444 A | 12/1984 | Isenberg | |
| 4,728,584 A * | 3/1988 | Isenberg | 429/456 |
| 4,874,678 A | 10/1989 | Reichner | |
| 4,888,254 A | 12/1989 | Reichner | |
| 5,458,989 A * | 10/1995 | Dodge | 429/492 |
| 5,916,700 A | 6/1999 | Ruka et al. | |
| 6,361,893 B1 * | 3/2002 | George et al. | 429/468 |
| 7,320,836 B2 | 1/2008 | Draper et al. | |
| 2003/0186100 A1* | 10/2003 | Vora et al. | 429/31 |
| 2004/0234830 A1 | 11/2004 | Draper et al. | |
| 2006/0134489 A1* | 6/2006 | Sarkar et al. | 429/31 |
| 2007/0134539 A1 | 6/2007 | Chung et al. | |
| 2007/0160886 A1 | 7/2007 | Digiuseppe | |
| 2007/0243445 A1 | 10/2007 | Digiuseppe | |
| 2007/0264542 A1 | 11/2007 | Devoe et al. | |
| 2008/0003478 A1 | 1/2008 | Greiner et al. | |

FOREIGN PATENT DOCUMENTS

| | | |
|---|---|---|
| EP | 0442743 A1 | 8/1991 |
| WO | WO 02/37589 A2 | 5/2002 |
| WO | WO 2005/117192 A * | 12/2005 |

OTHER PUBLICATIONS

Nguyen Q. Minh, Ceramic Fuel Cells, Journal of American Ceramic Society, 1993, 76[3] 563-88.

* cited by examiner

*Primary Examiner* — Jonathan Crepeau
*Assistant Examiner* — Kenneth Douyette

(57) ABSTRACT

A solid oxide fuel cell (400) is made having a tubular, elongated, hollow, active section (445) which has a cross-section containing an air electrode (452) a fuel electrode (454) and solid oxide electrolyte (456) between them, where the fuel cell transitions into at least one inactive section (460) with a flattened parallel sided cross-section (462, 468) each cross-section having channels (472, 474, 476) in them which smoothly communicate with each other at an interface section (458).

12 Claims, 9 Drawing Sheets

SOLID OXIDE FUEL CELL WITH TRANSITIONED CROSS-SECTION FOR IMPROVED ANODE GAS MANAGEMENT AT THE OPEN END

GOVERNMENT CONTRACT

The Government of the United States of America has rights in this invention pursuant to Contract No. DE-FC26-05NT42613 awarded by the U.S. Department of Energy.

FIELD OF THE INVENTION

The present invention relates to a hybrid, combination, fuel cell structure, having both active and inactive zones and cross-sections, that has an extended amount of fuel electrode surface per unit stack volume and allows ease of insertion of oxidant/air feed tubes, if they are used. This structure is made by integration of two different cell configurations, preferably—the "flattened" and "triangular" tubular, elongated, hollow seamless designs into a single structure and further allows incorporation of cross-flow recirculation passages between adjacent fuel cell structures.

BACKGROUND OF THE INVENTION

High temperature solid oxide electrolyte fuel cells (SOFC) have demonstrated the potential for high efficiency and low pollution in power generation. Successful operation of SOFCs for power generation has been limited in the past to temperatures of around 1000° C., due to insufficient electrical conduction of the electrolyte and high air electrode polarization loss at lower temperatures. U.S. Pat. Nos. 4,490,444 and 5,916,700 (Isenberg and Ruka et al. respectively) disclose one type of standard, solid oxide tubular elongated, hollow type fuel cells, which could operate at the above described relatively high temperatures. In addition to large-scale power generation, SOFCs which could operate at lower temperatures would be useful in additional applications such as auxiliary power units, residential power units and in powering light-duty vehicles.

Solid oxide electrolyte fuel cell (SOFC) generators that are constructed in such a way as not to require an absolute seal between the oxidant and the fuel streams, presently use closed ended fuel cells of circular cross section, such as shown in FIG. 1 of the drawings. Air flows inside the tubes and fuel flows outside, as shown in FIG. 2 of the drawings, where air passes through a feed tube, exits at the end of a cell and reverses flow to react with the inner fuel cell air electrode. In these cells, interconnection, electrolyte and fuel electrode layers are deposited on an extruded and sintered lanthanum manganite air electrode tube by plasma spray techniques. A lanthanum chromite interconnection is in the form of a narrow strip that runs axially over the entire active length of the air electrode tube. A yttria stabilized zirconia solid electrolyte is deposited in such a way as to almost entirely cover the air electrode tube. This yttria stabilized zirconia does not become an active electrolyte until a temperature over about 700° C. is achieved in the fuel cell. The electrolyte layer contacts or overlaps the edges of the interconnection strip leaving most of the interconnection exposed. Because the interconnection and electrolyte layers are dense, an overlap feature can provide a seal that prevents direct mixing of air and fuel gas in the air electrode.

A nickel/yttria stabilized zirconia cermet, fuel electrode anode layer is deposited in such a way as to almost entirely cover the electrolyte, but leaves a narrow margin of electrolyte between the interconnection and the fuel electrode. This margin prevents shorting of the cell. Series electrical connection between cells is accomplished by means of a structure made from nickel mesh, or, more recently, nickel foam and nickel screen, as shown in U.S. Patent Application Publication U.S. 2004/0234830 A1 (Draper et al.). The foam part of the connection becomes sintered to the interconnection while the screen part becomes sintered to the fuel electrode of the adjacent cell. Problems associated with the tubular cell are limited power density, long current path, and potential bowing after curing.

Cells of a flattened tubular, elongated, hollow, seamless parallel sided cross section, that have a number of ribs connecting the adjacent paralleled sides of the lanthanum manganite air electrode extrusion, have achieved substantially higher power density than the cylindrical cells, and are candidates to form the basic element of the next generation of SOFC generators, see FIG. 3 of the drawings. These flattened cells are described in U.S. Pat. No. 4,888,254 (Reichner) and U.S. Patent Application Publications U.S. 2007/0160886 A1 and particularly the figures in U.S. 2007/0243445 A1 (both Digiuseppe). Air flows within discrete passages that are formed between the ribs and flat sides of the air electrode. This type cell will hereinafter be referred to as "flattened" tubular, elongated, hollow type cell. They have internal gas flow channels.

These flattened tubular, elongated, hollow cells are also referred to in some instances as HPDX cells, where HPD indicates "high power density" and X indicates the number of air passages/channels. In these so called HPD cells a lanthanum chromite interconnection is preferably deposited over the entirety of one flat face of the air electrode. A yttria stabilized zirconia electrolyte covers the opposite face and the rounded edges of the air electrode so as to overlap the edges of the interconnection surface but leave most of this surface exposed. A standard nickel/yttria stabilized zirconia cermet fuel electrode covers the electrolyte except for a narrow margin of electrolyte that surrounds the interconnection. Series electrical connection between cells is accomplished by means of a nickel felt structure a flat face of which is sintered to the interconnection while the raised ribs of which are sintered to the fuel electrode face of the adjacent cell. This type cell is more efficient in generating power because of its larger active area and shorter circuit path.

Another cell geometry has been tested in which the lanthanum manganite air electrode has the geometric form of a number of integrally connected elements of triangular cross section, see FIG. 4 of the drawings. These triangular tubular, elongated, hollow cells have been referred to in some instances as Delta X cells where Delta is derived from the triangular shape of the elements and X is the number of elements. These type cells are described for example in U.S. Pat. Nos. 4,476,198; 4,874,678 (FIG. 4); U.S. Patent Application Publication U.S. 2008/0003478 A1, and International Publication No. WO 02/37589 A2 (Ackerman et al., Reichner; Greiner et al., and Thomas et al. respectively). A basic publication N. Q. Minh, in "Ceramic Fuel Cells", *J. Am. Ceramic Soc.,* 76 [3] 563-588, 1993 describes in detail a variety of fuel cell designs, including the tubular and triangular types, as well as materials used and accompanying reactions.

Generally, in newer triangular, tubular, elongated, hollow cross-section, so called Delta X cells, the resulting overall cross section has a flat face on one side and a multi-faceted triangular face on the other side. Air-flows within the internal discrete passages of triangular shapes where, at the end of the cell, the air can reverse flow to react with the air electrode if air feed tubes are used. In the Greiner et al. publication, above, a complicated transverse channel is used to cause reverse flow so air passes down one channel and up an adjacent one so air feed tubes can be eliminated. The fuel channels are built into multiple adjacent units of the triangular tubular type cells, and provide better fuel distribution and equal cross-section of air and fuel channels. All three designs described above, however, present problems of sealing the ends of the cell.

In the triangular tubular, elongated, hollow, so called Delta X cells, a dense lanthanum chromite interconnection covers the flat face. A yttria-stabilized zirconia electrolyte usually covers the multifaceted triangular face and overlaps the edges of the interconnection but leaves most of the interconnection exposed. A standard nickel/yttria stabilized zirconia fuel electrode usually covers most of the electrolyte but leaves a narrow margin of electrolyte between the interconnection and the fuel electrode. Series electrical connection between cells can be accomplished by means of a flat nickel felt or nickel foam panel, one face of which is sintered to the interconnection while the other face contacts the apexes of the triangular multifaceted fuel electrode face of the adjacent cell. This felt or foam also aids in shock absorption properties.

Most of these designs utilize air feed tubes, which present their own set of issues, since it is difficult to manufacture long, completely straight ones. This in turn can create problems of binding when insertion into the air feed volume of the cells is attempted.

Flattened and triangular tubular, elongated, hollow, seamless cells, FIGS. 3 and 4 operate with higher current density than current cylindrical cells and stack packing is improved. Relative to cylindrical cells, flattened and triangular tubular cells achieve less ohmic resistance, therefore cell voltage can be closer to theoretical. The triangular tubular, elongated, hollow cell, in particular, because of its thin triangular cross-sectional configuration, at open ends, poses particular difficulties in sealing and in providing transverse recirculation gas streams.

Other tubular, elongated, hollow fuel cell structures, shown in FIG. 5(a)-(g) are described by Isenberg, FIG. 7 in U.S. Pat. No. 4,728,584—"corrugated design" and by Greiner et al. FIG. 2(a)-(g)—"triangular", "quadrilateral", "oval", "stepped triangle" and a "meander"; all herein considered as hollow elongated tubes. Solid oxide fuel cell generators, utilizing tubular SOFC are shown for example in U.S. Pat. No. 7,320,836 B2 (Draper et al.), showing depleted anode (fuel electrode) spent fuel gas (66) recirculation.

As described above, there is a long felt need for a fuel cell stack design that accomplishes all of: higher current density, extended fuel electrode surface per unit stack volume, better sealing of active cell ends and ease of insertion of air feed tubes, so that it provides commercialization possibilities. It is a main object of this invention to provide a single cell type that can solve all those needs. It is another object of this invention to accomplish ease of transverse spent fuel flow in a tubular cross-section design and to provide a viable commercial design.

SUMMARY OF THE INVENTION

The above mentioned problems which show a need for higher current density design, extended fuel electrode surface per unit stack volume, and better end tube sealing are solved by providing: a hybrid solid oxide fuel cell having a tubular elongated, hollow, active cross-section, for example a triangular or wave type cross section, comprising an interconnection, air electrode, a fuel electrode, and solid oxide electrolyte between the electrodes, which active cross-section integrally forms, transitions, "morphs" or flows into, that is without separate pieces, at least one inactive cross-section with a flattened parallel sided cross-section; each cross-section having channels therein which smoothly communicate with each other, for gas guidance within the same channel, at an interface section, each communicating channel containing at least one open end.

The invention also resides in a solid oxide fuel cell stack comprising at least two parallel adjacent, electrically interconnected, parallel, hybrid solid oxide fuel cells having a 20 vol. % porous to 85 vol. % porous, non-electrically conducting, compliant gasket strip at any open fuel cell end, providing a seal less design and a separation between the parallel, adjacent, fuel cells, each fuel cell containing: (1) an active cross-section of interconnection, interior air electrode and exterior fuel electrode with solid oxide electrolyte between the electrodes, the active cross-section having a tubular, elongated hollow sided cross-section, and (2) at least one inactive cross-section with a flattened, parallel sides cross-section, each cross-section being integral, that is without separate pieces, and having interior channels therein which smoothly communicate, "morph", with each other, for gas guidance within the same channel, at a cross-section interface, each communicating channel containing at least one open end; where air/oxidant can be fed into the open end, while contacting an air electrode material on the inside of the active part of the channel, and a fuel can pass through integral fuel channels, adjacent to the fuel electrodes, to the gasket strip at an open cell end, which gasket strip at the open end will allow a predetermined amount of fuel to pass through it and a predetermined amount of fuel to pass out of the stack transverse to the gasket, said fuel contacting a fuel electrode on the outside of the active cross-section. In one design where the fuel cells are open at both ends a "once through" design, the gasket strip can have from 20 vol. % to 85 vol. % porosity, providing spent fuel flow impedance.

As used herein "tubular, elongated hollow" section or cross-section is defined to include: triangular, that is wave type; sinusoidally shaped wave; alternately inverted triangular folded shape; corrugated; delta; Delta; square; oval; stepped triangle; quadrilateral; and meander configurations. As used herein "flattened" is defined as having a structure similar to that shown in FIG. 2 and FIG. 3 of U.S. Patent Application Publication U.S. 2007/0243445 A1 (Diguiseppe), and FIG. 3 of this application's drawings.

BRIEF DESCRIPTION OF THE DRAWINGS

The invention will become more readily apparent from the following description of preferred embodiments thereof shown, by way of example only, in the accompanying drawings, wherein.

DESCRIPTION OF THE PREFERRED EMBODIMENTS

Solid oxide electrolyte fuel cell (SOFC) generators usually include a gas-tight, thermally insulated housing which houses individual chambers including a generator chamber and a combustion chamber. The generator chamber, in which power generation occurs, contains a solid oxide fuel cell stack which is made up of an array of connected solid oxide fuel cells, and associated fuel and air distributing equipment. The solid oxide fuel cells contained in the generator chamber can take on a variety of well known configurations, including tubular, flat plate, and corrugated designs.

Figure 1:
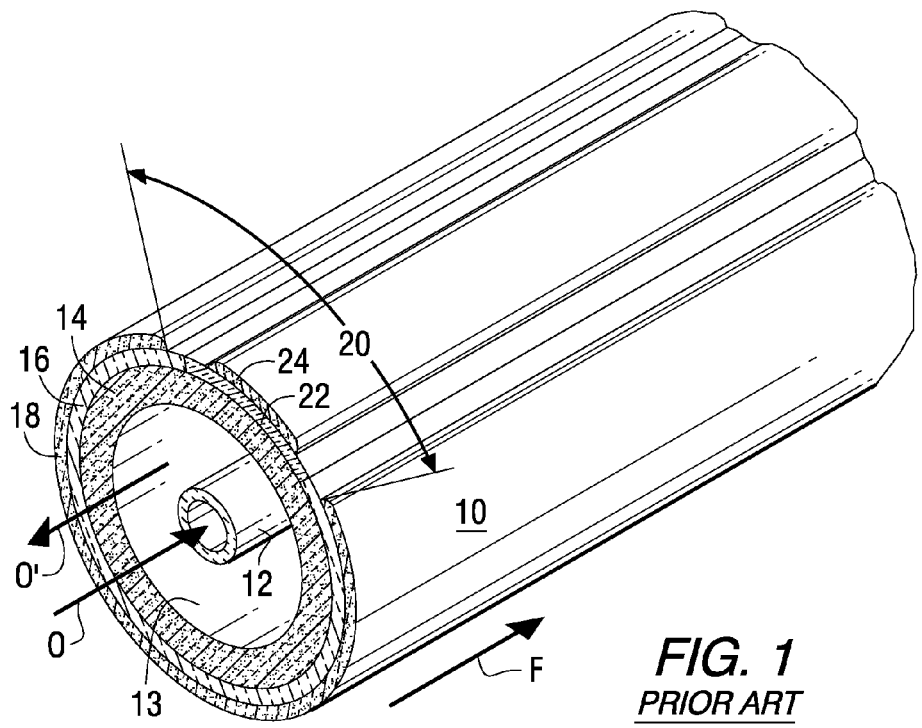
FIG. 1 is a sectional perspective view of one type prior art tubular solid oxide fuel cell showing an air feed tube in its center volume.
Figure 2:
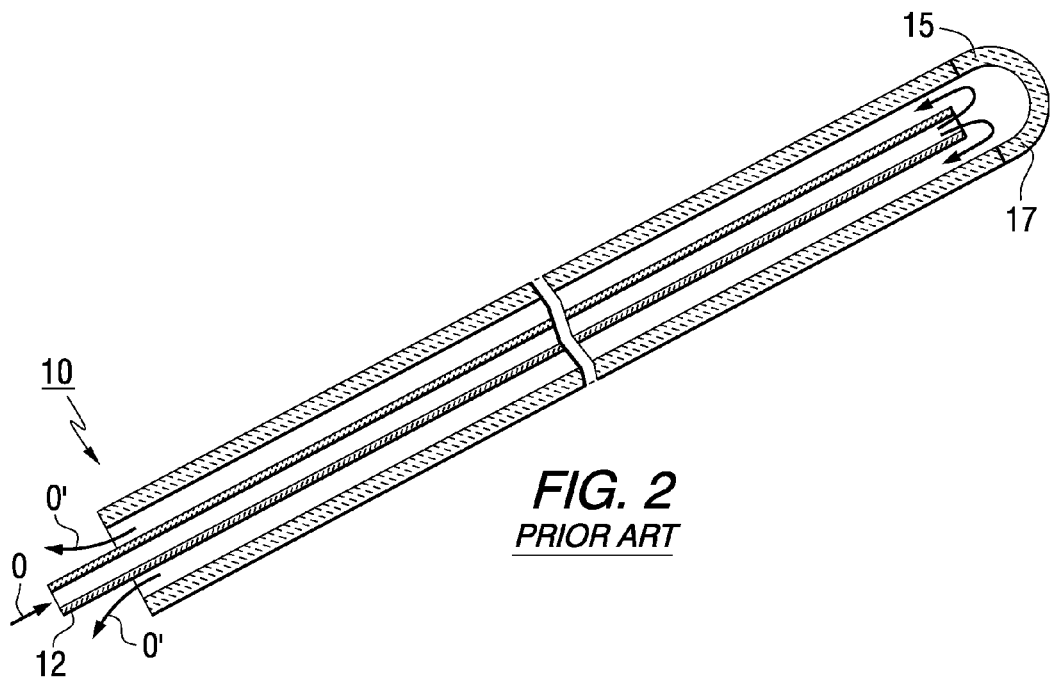
FIG. 2 is a partially schematic sectional view of one type prior art solid oxide fuel cell showing interior air flow path during operation and end seal attached to the rounded fuel cell.

FIG. 1 shows a tubular solid oxide fuel cell 10, which operates primarily the same as the other designs, and which will be described here in some detail because of its simplicity, and because its operating characteristics are universal and similar to both flattened and tubular, elongated hollow structured fuel cells such as triangular SOFC's. Most components and materials described for this SOFC will be the same for the other type fuel cells shown in the figures. A preferred SOFC configuration has been based upon a fuel cell system in which a gaseous fuel F, such as natural gas, hydrogen or carbon monoxide, is directed axially over the outside of the fuel cell, as indicated by the arrow F. A gaseous oxidant, such as air or oxygen O, is fed through an air/oxidant feed tube, here called air feed tube 12, positioned within the annulus 13 of the fuel cell, and extending near the closed end of the fuel cell (not shown), and then out of the air feed tube back down the fuel cell axially over the inside wall of the fuel cell, while reacting to form depleted gaseous oxygen, as indicated by the arrow O' and as better shown in FIG. 2, which is essentially a cross-section of FIG. 1. In FIG. 2, reverse flow of gaseous oxygen is shown at the end 15 of the fuel cell 10. The fuel cell end is usually cemented or sintered at joint 17.

Returning to FIG. 1, the prior art solid oxide fuel cell shown comprises a tubular air electrode 14 (or cathode). The air electrode 14 may have a typical thickness of about 1 to 3 mm. The air electrode 14 can comprise doped lanthanum manganite having an $ABO_3$ perovskite-like crystal structure, which is extruded or isostatically pressed into tubular shape and then sintered.

Surrounding most of the outer periphery of the air electrode 14 is a layer of a dense, solid electrolyte 16, which is gas tight and dense, but oxygen ion permeable/conductive, typically made of calcia- or yttria-stabilized zirconia. The solid electrolyte 16 is typically about 0.001 to 0.1 mm thick, and can be deposited onto the air electrode 14 by conventional electrochemical vapor deposition (EVD) techniques.

In the prior art design, a selected radial segment 20 of the air electrode 14, preferably extending along the entire active cell length, is masked during fabrication of the solid electrolyte, and is covered by a interconnection 22, which is thin, dense and gas-tight provides an electrical contacting area to an adjacent cell (not shown) or to a power contact (not shown). The interconnection 22 is typically made of lanthanum chromite ($LaCrO_3$) doped with calcium, barium, strontium, magnesium or cobalt. The interconnection 22 is roughly similar in thickness to the solid electrolyte 16. An electrically conductive top layer 24 is also shown.

Surrounding the remainder of the outer periphery of the tubular solid oxide fuel cell 10, on top of the solid electrolyte 16, except at the interconnection area, is a fuel electrode 18 (or anode), which is in contact with the fuel during operation of the cell. The fuel electrode 18 is a thin, electrically conductive, porous structure, typically made in the past of nickel-zirconia or cobalt-zirconia cermet approximately 0.03 to 0.1 mm thick. As shown, the solid electrolyte 16 and fuel electrode 18 are discontinuous, with the fuel electrode being spaced-apart from the interconnection 22 to avoid direct electrical contact.

Figure 3:
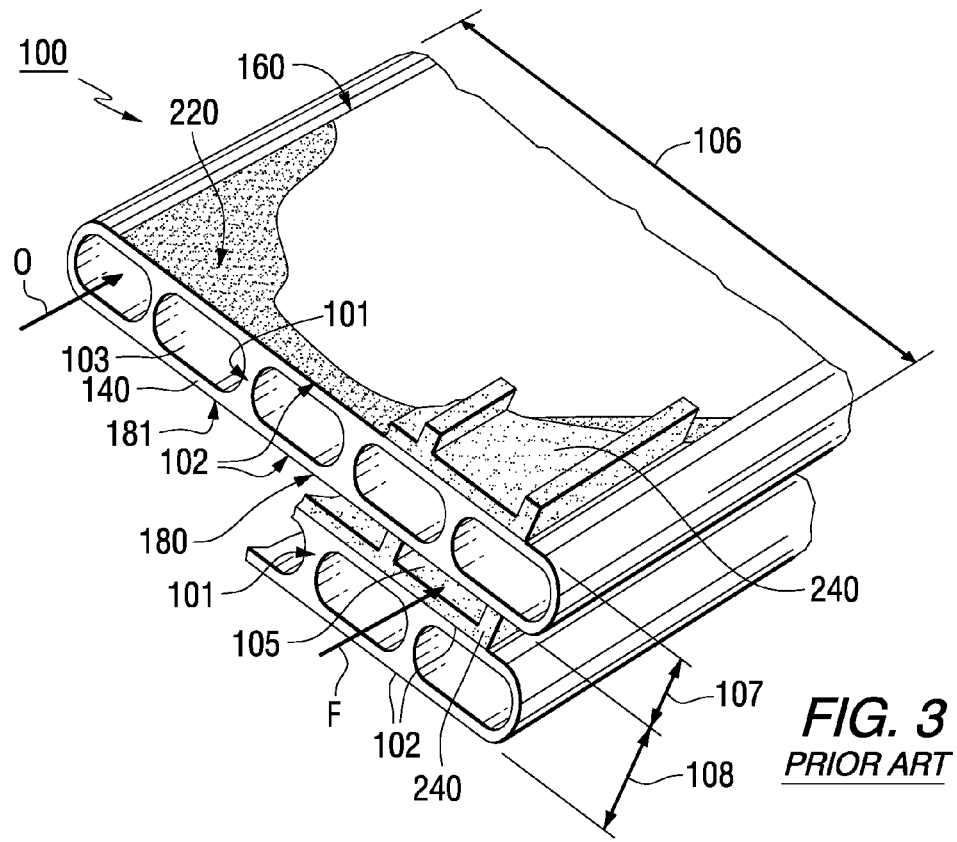
FIG. 3 is a sectional perspective view of one type prior art flattened solid oxide fuel cell stack of two fuel cells, showing oxidant and fuel flow paths but not air feed tubes for sake of simplicity.

Referring now to FIG. 3 a prior art, flattened/planar, so called "high power density" (HPD), herein flattened solid oxide fuel cell stack is shown. The flattened solid oxide fuel cells 100 have a flattened parallel sided cross section that have a plurality of ribs 101, having a generally curved, circular, semi-circular, elliptical and the like, interior surface connecting adjacent parallel sides 102. Oxidant such as air O will enter the air passageways 103, usually through air feed tubes (not shown for the sake of simplicity). The air electrode 140 provides the main body of the flattened structure. The fuel electrode 180 (not completely shown) covers the reverse bottom side 181 of the flattened structure. The fuel cell stack shown has a top fuel cell and an adjacent fuel cell attached by electrically conductive layer 240 usually nickel felt, having structural openings 105 through which a fuel F can pass, The solid electrolyte 160 and top interconnection 220 are on top of each cell on the opposite side of the fuel electrode 180. Examples of some dimensions are width 106—about 100 mm., cell plate thickness 107—about 10 mm and distance between the bottom of the adjacent plate to the bottom of the top plate 108—about 15 mm. This flattened SOFC design is active through its entire length, containing continuous air electrode, fuel electrode and electrolyte components as shown.

Figure 4:
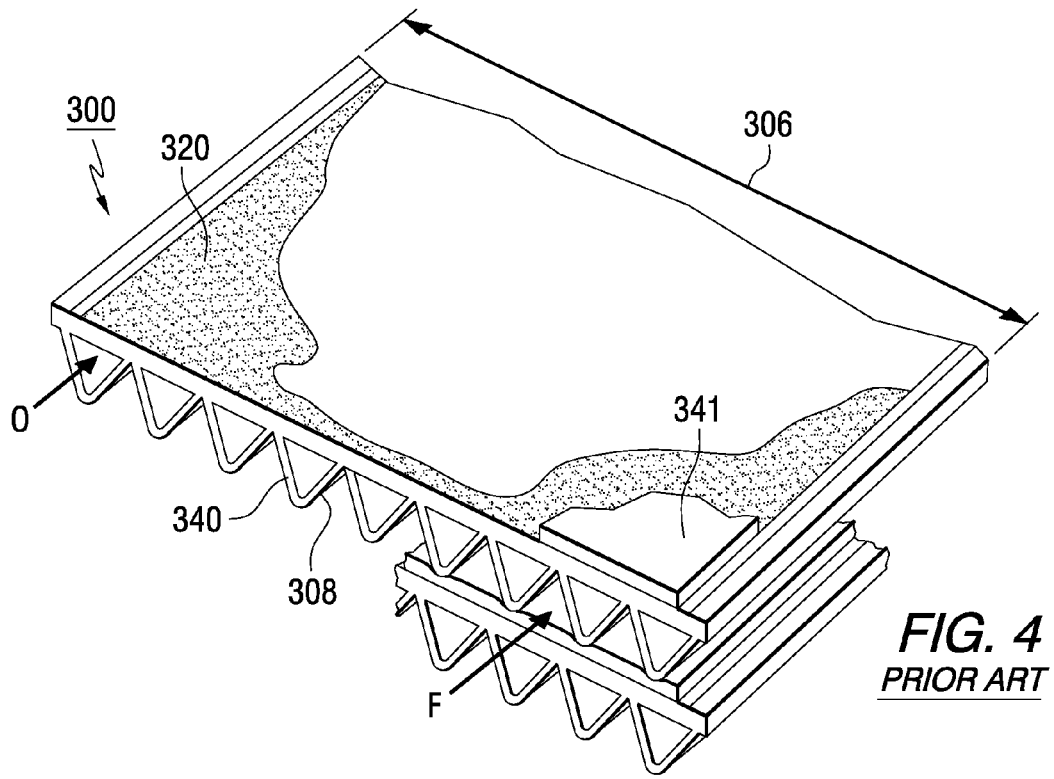
FIG. 4 is a sectional perspective view of one type prior art triangular, solid oxide fuel cell stack of two fuel cells, showing oxidant and fuel flow paths but not air feed tubes for sake of simplicity.
Figure 5A:
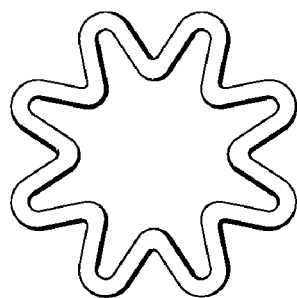
FIG. 5(a)-(g) illustrate alternate cross-sections for active portions of prior art fuel cell designs.
Figure 5B:
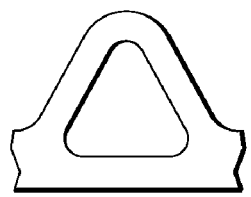
Figure 5C:
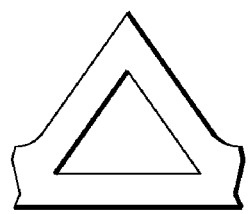
Figure 5D:
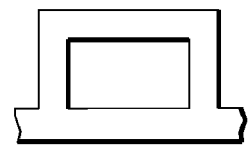
Figure 5E:
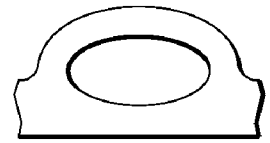
Figure 5F:
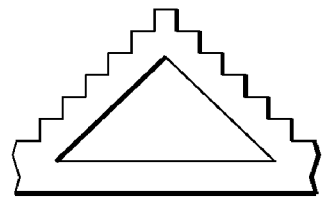
Figure 5G:
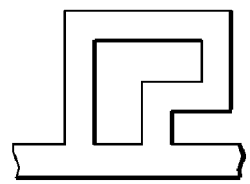

Referring now to FIG. 4, a prior art, a very high power density solid oxide fuel cell stack is shown. The cells are triangular solid oxide fuel cells 300. Here the air electrode 340 has the geometric form of a number of integrally connected elements of triangular cross section. The air electrode can be made of lanthanum manganite. The resulting overall cross section has a flat face on one side and a multifaceted face on the other side. Air O flows within the discrete passages of triangular shape as shown. An interconnection 320 generally of lanthanum chromite covers the flat face. A solid electrolyte covers the multifaceted face and overlaps the edges of the interconnection 320 but leaves most of the interconnection exposed. The fuel electrode 308 covers the reverse side from the flat face and covers most of the electrolyte but leaves a narrow margin of electrolyte between the interconnection and the fuel electrode. Nickel/yttria stabilized zirconia is generally used as the fuel electrode which covers the reverse side. Series electrical connection between cells is accomplished by means of an electrically conductive top layer 341 of flat nickel felt or nickel foam panel one face of which is sintered to the interconnection while the other face contacts the apexes of the triangular multifaceted fuel electrode face of the adjacent cell. An example of a dimension is width 306—about 100 mm and cell plate thickness—about 8.5 mm. This triangular cell design is actual throughout its entire length.

The above design descriptions have been included here because the inventive concept described below is a very unusual integration of active with an inactive area to form another completely different design. All the layers and electrochemistry of the above prior art designs and the inventive concept are somewhat similar. In the description below; to adequately describe all aspects of the invention, at times, it is necessary to review several Figures in the same paragraph.

FIGS. 5(*a*)-(*g*) illustrate prior art active fuel cell cross-sections: (a) corrugated/flower, (b)(c) triangular/wave, (d) square, (e) oval, (f) stepped triangle and (g) meander types. All of these are attempts to maximize active surface area and are herein considered of a tubular nature and can be used in the active section/cross-section of this invention.

Figure 6:
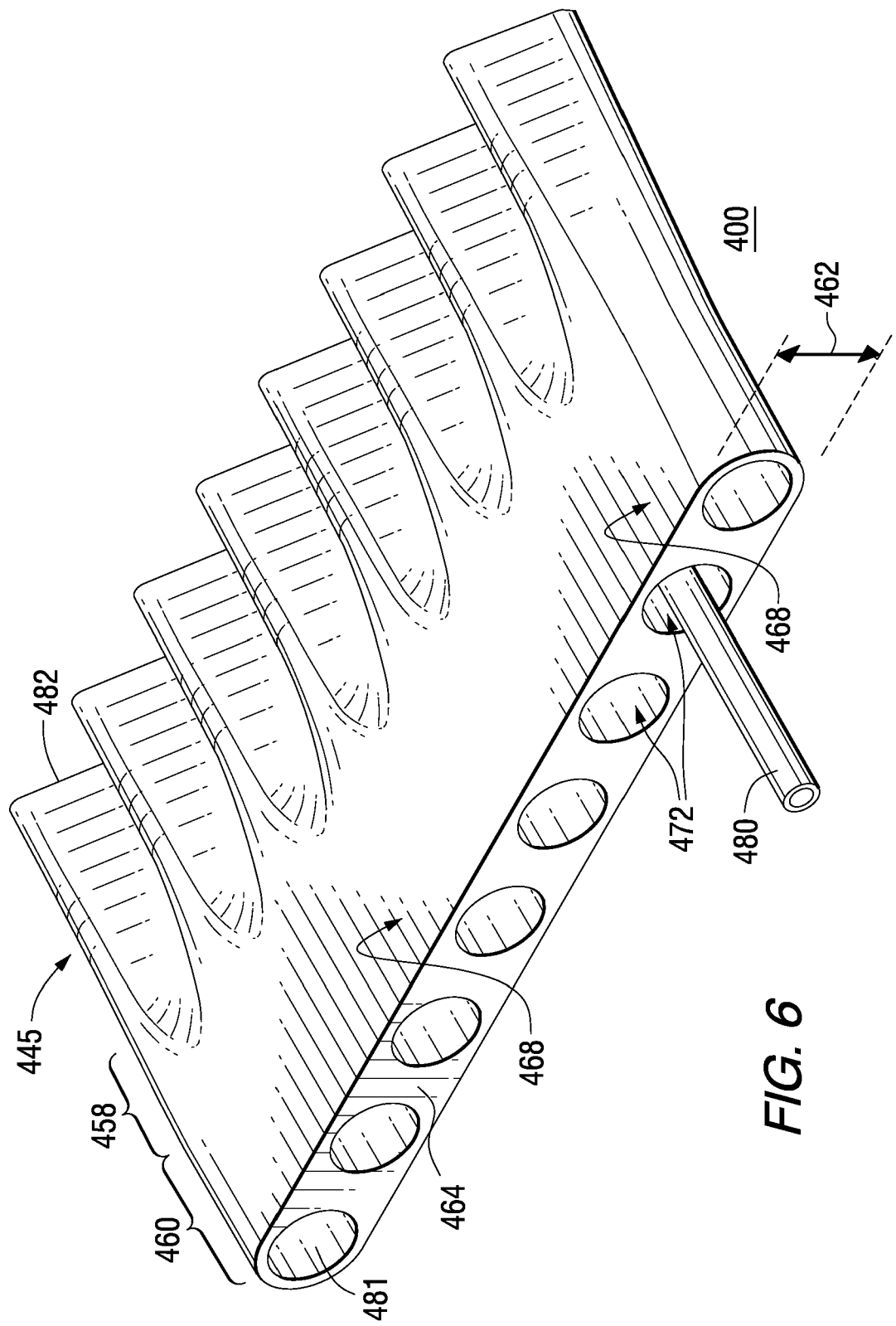
FIG. 6, which best shows the broadest aspect of this invention, is a foreshortened, three dimensional top view of a portion of a hybrid, transitioned fuel cell structure with a flattened open non-active cross-section and a triangular active section merged into each other, where air feed tubes are not shown for sake of simplicity.
Figure 7:
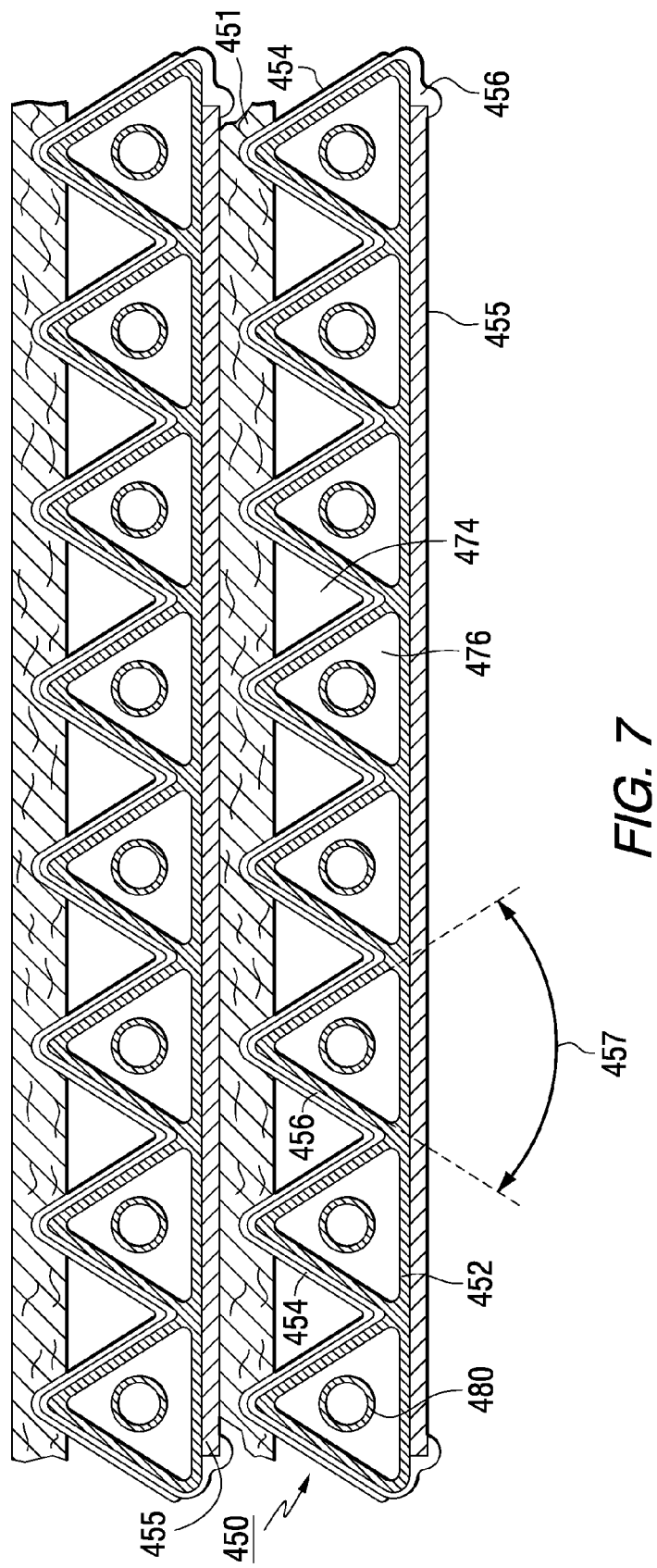
FIG. 7, which is a general cross-sectional view of the hybrid fuel cell of FIG. 8, with additional top nickel felt/foam connection material shown so that a complete repeating cell unit is described.

Now, referring to FIG. 6 and FIG. 7, the broadest scope of the invention is shown. FIG. 6 illustrates a solid oxide fuel cell 400 having a triangular, active length 445 having a triangular cross-section 450 shown in FIG. 7 containing a bottom interconnection 455 as well as an air electrode 452, a fuel electrode 454, and solid oxide electrolyte 456 therebetween, where the triangular active length 445 in FIG. 6 integrally forms/transitions, at an interface section 458, into a inactive section 460 having a structurally strong inactive cross-section 462 and an open face 464. The inactive cross-section 462 has flattened parallel sides 468, as shown. Each cross-section has channels therein, 472 in FIG. 6 for fuel 474 and air 476 as shown in FIG. 7 where the air channels 476 smoothly communicate/transition with each other as shown in FIG. 6 at the interface section 458 and in FIG. 11 at 686. Each channel 472 in FIG. 6 and air channels 476 in FIG. 7 can contain an air feed tube 480 in both FIG. 6 and FIG. 7, each channel having an open end 481 and a closed end 482 (foreshortened for simplicity). Also, only one air feed tube 480 is shown in FIG. 6 for simplicity. FIG. 7 shows all eight per cell air feed tubes 480, the porous electrically conducting cushion/compliant layer 451, and the interconnection 455 as well as triangle apex angle 50°-70° as 457, where the preferred 60° apex angle is shown in FIG. 7. FIG. 7 shows two fuel cells stacked on top of each other in a repeating unit. The electrode layers of the top fuel cell are the same as those of the bottom fuel cells.

Thus, as shown in FIG. 6, an end portion of the solid oxide fuel cell 400 has an inactive section integral to the main fuel cell body and not a separate section which is somehow physically attached as by sintering providing a structurally strong total fuel cell body. Also, the open face 464 provides a larger surface area for face seal and the flattened parallel inactive cross-section 462, where 468 shows one flat surface, provides a large surface area for an added spent fuel flow control gasket (discussed later) to join to other fuel cells. This gasket will separate the other adjacent cells at the inactive end. The channels 472 can be circular as shown or triangular or oblong, but must provide large clearance openings for the air feed tube 480 if one is used. Thus the end channels 472 can be the same geometry as the active section channels.

Figure 8:
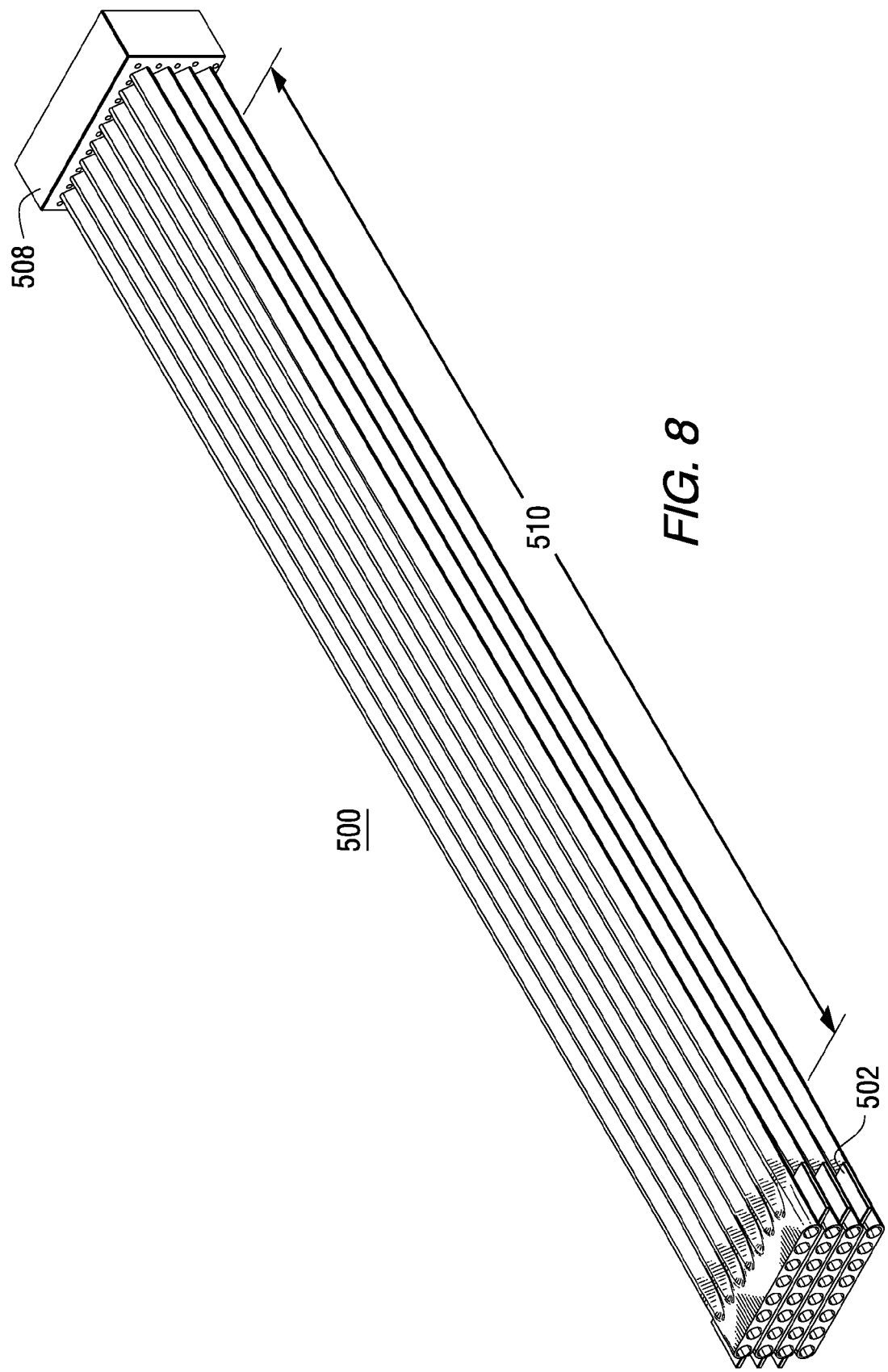
FIG. 8 is a top view of a solid oxide fuel cell stack of four hybrid, transitioned fuel cells, shown at full length with porous gasket strips at the open flattened end and a fuel distribution board on the closed triangular end.
Figure 9:
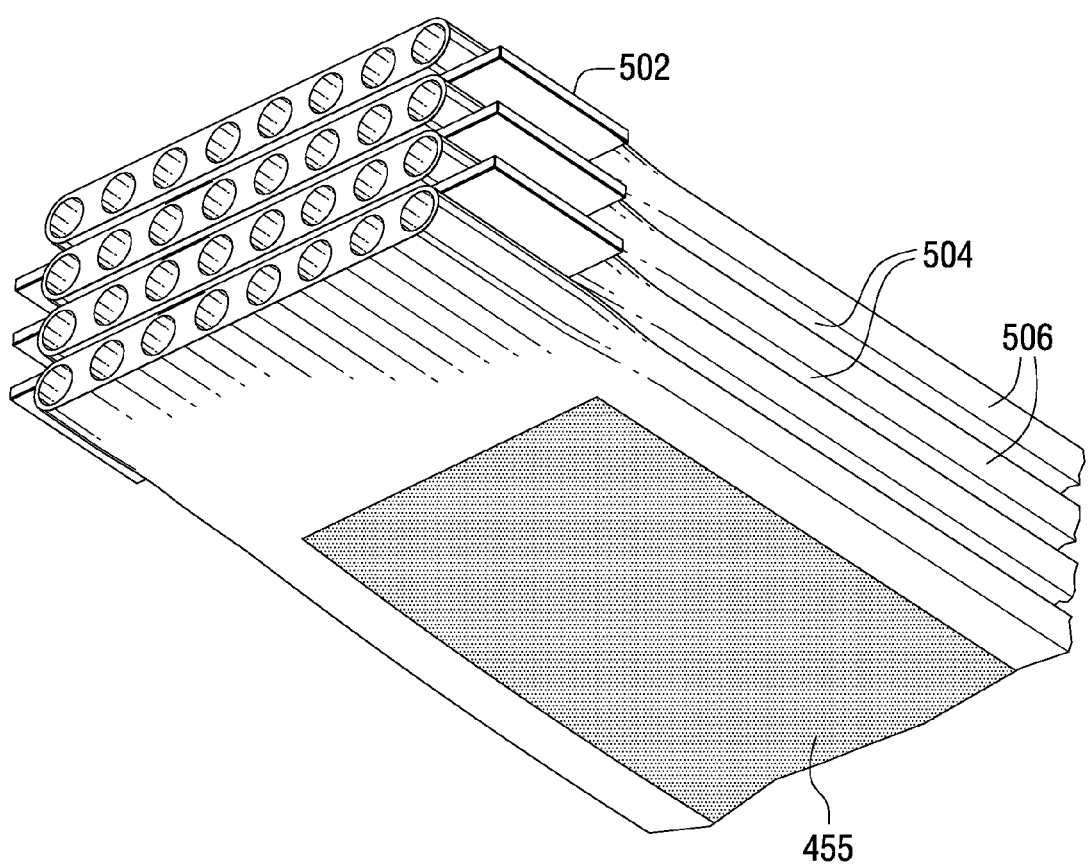
FIG. 9 is a three dimensional bottom view of a solid oxide fuel cell stack of three hybrid, transitional fuel cells, showing porous gasket strips at the open flattened end and the separation between adjacent fuel cells where air feed tubes are not shown for simplicity sake.
Figure 10:
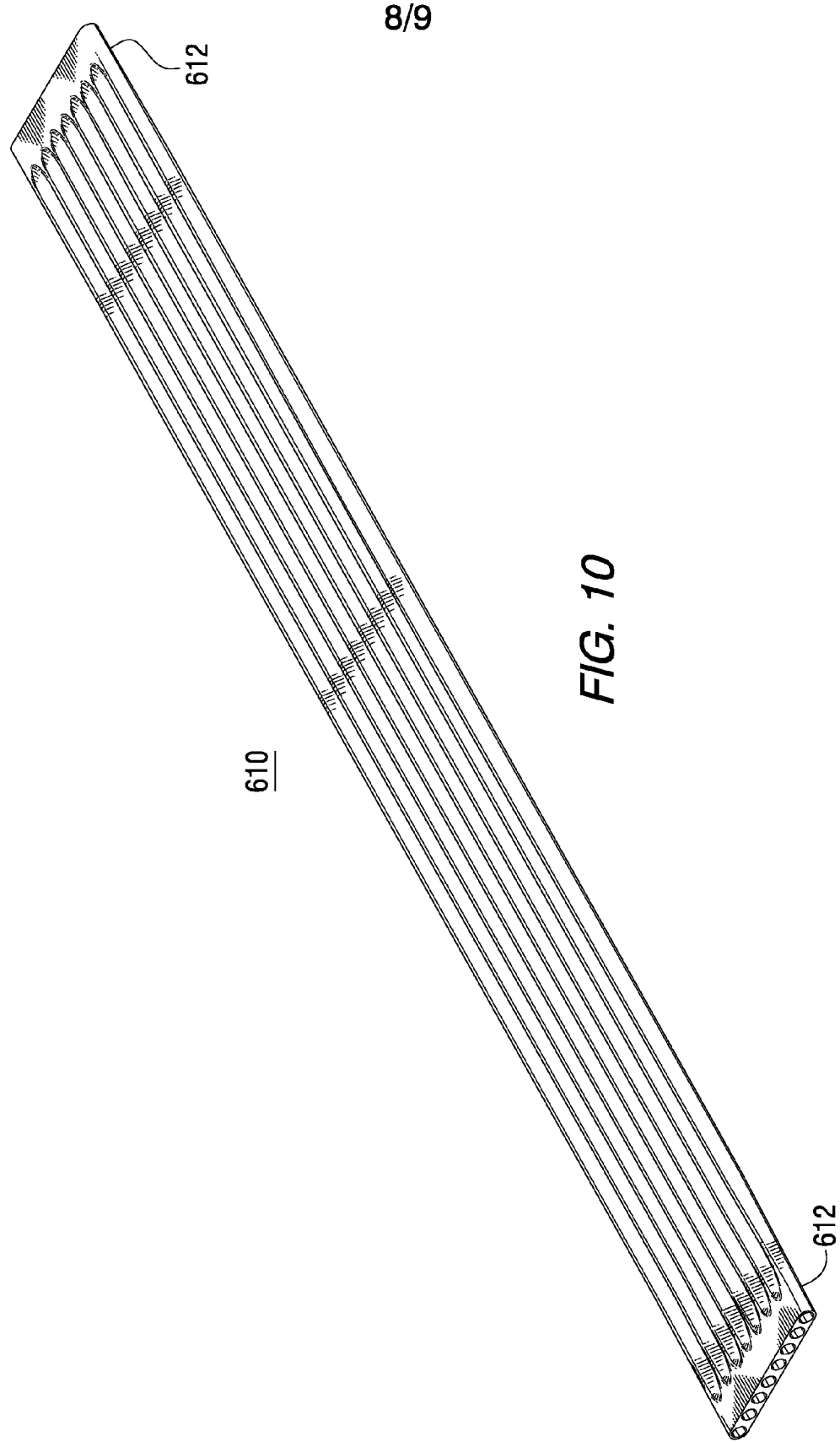
FIG. 10 is a top view of a hybrid solid oxide fuel cell of a "once through" design, having two flattened open non-active cross sections and no air flow tubes for oxidant through sealed operation.

FIG. 8 provides a full length isometric view of a solid oxide fuel cell stack 500, having an active length 510 and showing a plurality of non-electrically conducting, compliant gasket strips 502 in both FIG. 8 and FIG. 9, providing a separation or gap 504 better seen in FIG. 9, between adjacent parallel fuel cells 506. FIG. 9 also shows the interconnection 455 shown in FIG, 7. FIG. 8 also shows a fuel distribution board 508 positioned at the closed end of the active length 510 of the stack. FIG. 10 shows a full length isometric view of a solid oxide fuel cell 610 having two flattened inactive ends 612, with parallel sides and no air oxidant tubes, herein defined as a "once through" design for air, where any gasket used at both ends must be a near absolute seal, that is, having at least 98% theoretical density, providing flow impedence, to separate the air from the fuel regions.

Figure 11:
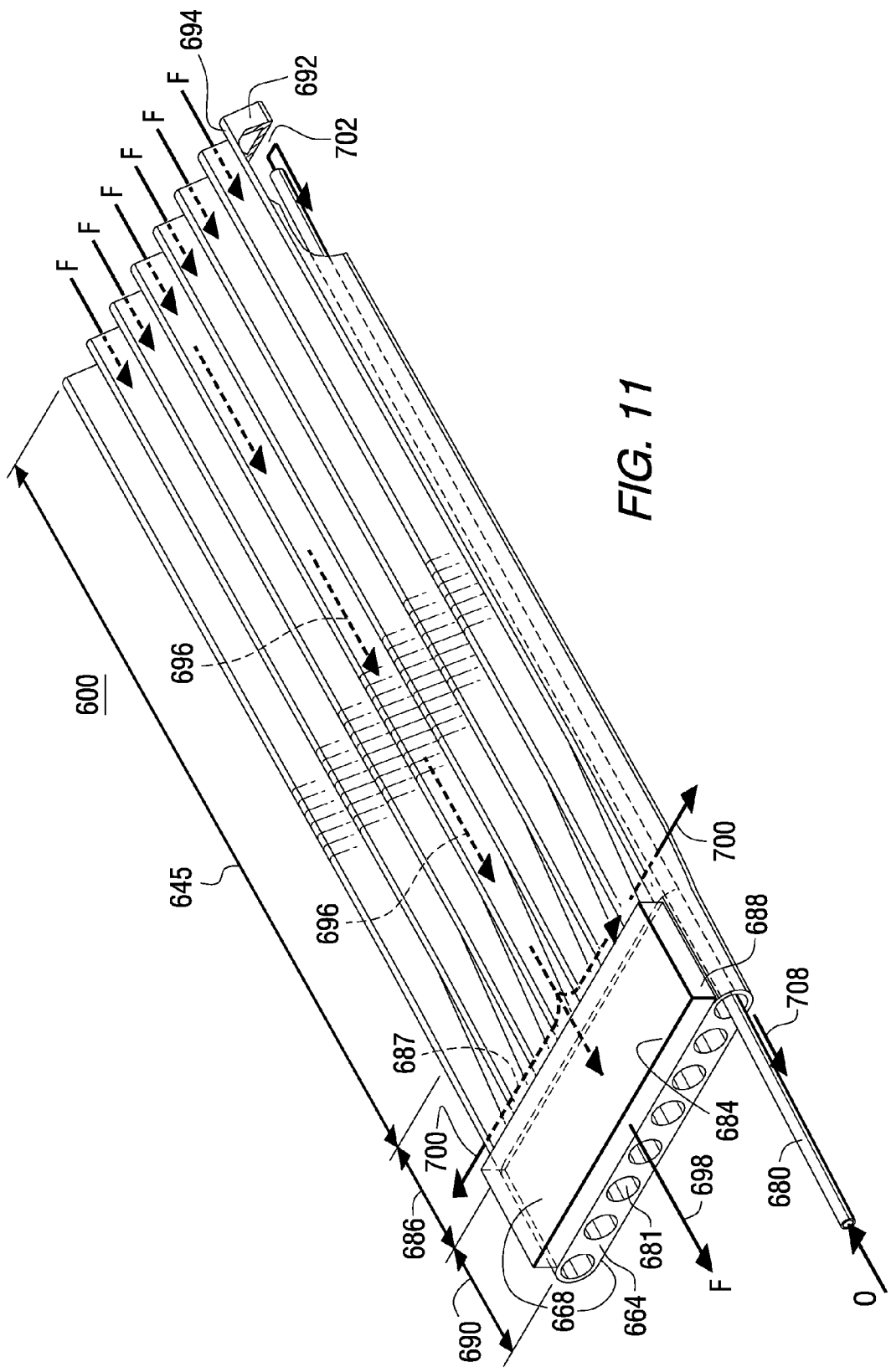
FIG. 11, which best shows the operation of this invention is a sectional perspective view of a hybrid, transitional solid oxide fuel cell showing air feed tube placement, with only one air feed tube shown for simplicity, and air/oxidant and fuel flows.

Referring now to FIG. 11, which is similar to FIGS. 6, 8 and 9, where inlet air is in counter flow mode to outlet air, and which better illustrates the operational aspects of the invention. Solid oxide fuel cell 600 has a triangular active length 645 with a triangular active cross-section. This triangular active cross-section, best shown in FIG. 7, previously discussed, contains a bottom interconnection as well as an air electrode, fuel electrode interconnection and solid oxide electrolyte therebetween. An interface section 686 smoothly transitions/flows into the inactive section 690 having an open face 664 and flattened parallel sides 668 with a flattened parallel inactive cross-section as shown at the open face, and best shown in FIG. 6 as 462. Channels 681 in the open-face 664 will all contain air feed tubes 680, although one is only shown in FIG. 11 for sake of simplicity.

The solid oxide fuel cell has an open end at the open face 664 and a closed end 692. It also has a seal area 684 and a side recirculation passage 687 in and at the interface section 686, present when two adjacent fuel cells are assembled. This side recirculation passage 687 is formed by a porous, non-electrically conducting, compliant gasket strip 688 installed over the inactive section 690. These are also shown in FIGS. 8 and 9 as porous, gasket strips 502 causing separation 504 between adjacent parallel fuel cells 506, allowing the recirculation passage shown in FIG. 11 for fuel F, after passing over the fuel electrode to become spent fuel recirculation paths 700.

Fuel F passes between and outside the triangles 694 contacting a fuel electrode, best shown as 454 in FIG. 7 on the active outside side of the triangles 694 to provide reacted spent fuel 696 which passes through the separation between adjacent fuel cells, 504 in FIG. 9, into recirculation passage 687. There, the gasket strip 688 allows a predetermined amount of spent fuel 698 to pass through the gasket strip 688, which is about 20 vol. % to 85 vol. % porous. Another predetermined amount of spent fuel follows spent fuel path 700, from about 60 vol. % to about 70 vol. %, and passes out of the fuel cell transverse to the gasket strip, to perform other functions as recirculated spent fuel, which is needed for steam reforming of the incoming fresh natural gas fuel.

Process air O is fed into the air feed tube 680 and passes to the closed end 692 and reverse flows at point 702 passing upwards in the annular space between the cell cathode and the air feed tube back through the air passage, while contacting the air electrode within the channels to provide air stream 708 which exits at the open end of the cells, enters a combustion zone (not shown) and reacts with spent fuel to completely consume the remaining fuel.

While there is described what is now considered to be the preferred embodiment of the invention, it is, of course, understood that various other modifications and variations will occur to those skilled in the art. The claims, therefore, are intended to include all such modifications and variations which fall within the true spirit and scope of the present invention.

What is claimed is:

1. A hybrid solid oxide fuel cell having a tubular, elongated, hollow, triangular active cross-section comprising an interconnection, air electrode, fuel electrode, and solid oxide electrolyte between the electrodes, which active triangular cross-section integrally transitions into at least one inactive flat cross-section with flattened parallel sides; each cross-section having channels therein which morph into and communicate with each other, for gas guidance within the same channel, at an interface section, without separate pieces, each communicating channel containing at least one open end, wherein, within the fuel cell, air feed tubes can pass from within the inactive cross-section to the active cross-section, wherein the active interior and exterior cross-section and channels are triangular and the inactive flat cross-section channels are selected from the group consisting of circular, triangular or oblong, and wherein the exterior cross sections also morph into each other.

2. The hybrid solid oxide fuel cell of claim 1, having one open inactive and one closed active end, where at the interface section there is a continuous shape transition.

3. The hybrid solid oxide fuel cell of claim 1, having two open fuel cell ends.

4. The hybrid solid oxide fuel cell of claim 1, wherein the active cross-section at the interface section, integrally forms, merges and morphs into the inactive cross-section, without separate pieces, forming a structurally strong total fuel cell body.

5. The hybrid solid oxide fuel cell of claim 1, wherein the active cross-section of the interface section is not a separate section physically attached, as by sintering, to the inactive cross-section.

6. The hybrid solid oxide fuel cell of claim 1, having an open face at an inactive end providing a large surface area for a face seal.

7. The hybrid solid oxide fuel cell of claim 1, wherein the inactive cross-section has a flattened cross-section at the inactive section top and bottom providing a large surface area for separating other adjacent cells at the inactive end through a gasket.

8. A solid oxide fuel cell stack comprising at least two parallel, adjacent, electrically interconnected, hybrid solid oxide fuel cells having a porous, ceramic non-electrically conducting, compliant gasket strip at any open fuel cell end, providing a separation between the parallel adjacent, fuel cells, each fuel cell containing:

(1) an active cross-section of an interconnection, interior air electrode, and exterior fuel electrode with solid oxide electrolyte between the electrodes, the active cross-section having a tubular, elongated, hollow sided cross-section selected from the group consisting of triangular, corrugated, and stepped triangle; and (2) at least one inactive flat cross-section with a flattened parallel sides; each cross-section being integral and having interior channels therein which morph into and communicate with each other without separate pieces, for gas guidance within the same channel, at a cross-section interface, each communicating channel containing at least one open end; where air can be fed into the open end, while contacting an air electrode material on the inside of the active part of the channel, and a fuel can pass through integral fuel channels adjacent to the fuel electrode, to the gasket strip at an open cell end, which gasket strip at an open end will allow a predetermined amount of spent fuel to pass through it, and a predetermined amount of spent fuel to pass out of the stack transverse to the gasket, said fuel contacting a fuel electrode on the outside of the active cross-section;

wherein the fuel cell stack has one open fuel cell end and one closed fuel cell end and at least one air/oxidant feed tube, where air/oxidant can be fed into the feed tube at the open end, pass to the closed end and reverse flow at the closed end and redirected to the open end while contacting air electrode material, wherein the inactive flat cross-section channels are selected from the group consisting of circular, triangular or oblong, and wherein the exterior cross sections also morph into each other.

9. The solid oxide fuel cell stack of claim 8, wherein the active tubular, elongated hollow side portion is a triangular side portion and the gasket strip is about 20 vol. % to 85 vol. % porous.

10. The solid oxide fuel cell stack of claim 8, having two open fuel cell ends.

11. The solid oxide fuel cell stack of claim 8, each fuel cell having two open fuel cell ends, where the compliant gasket strip is at least 98% theoretical density, providing flow impedance and the fuel cell is a once through design, where at the interface section there is a continuous shape transition.

12. The solid oxide fuel cell stack of claim 8, each fuel cell having one open end and one closed end, where the fuel cell stack is a seamless design, and wherein the active cross-section at the interface section, integrally forms, merges and morphs into the inactive cross-section, without separate pieces, forming a structurally strong total fuel cell body.

* * * * *